United States Patent
Guo et al.

(10) Patent No.: US 12,204,340 B2
(45) Date of Patent: Jan. 21, 2025

(54) SYSTEMS AND METHODS FOR OBSTACLE DETECTION USING A NEURAL NETWORK MODEL, DEPTH MAPS, AND SEGMENTATION MAPS

(71) Applicant: Toyota Motor Engineering & Manufacturing North America, Inc., Plano, TX (US)

(72) Inventors: Rui Guo, San Jose, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1144 days.

(21) Appl. No.: 16/996,495

(22) Filed: Aug. 18, 2020

(65) Prior Publication Data

US 2022/0057806 A1    Feb. 24, 2022

(51) Int. Cl.
| | |
|---|---|
| G05D 1/00 | (2024.01) |
| G06N 3/04 | (2023.01) |
| G06T 7/00 | (2017.01) |
| G06T 7/194 | (2017.01) |
| G06T 7/55 | (2017.01) |

(52) U.S. Cl.
CPC ............ G05D 1/0251 (2013.01); G06N 3/04 (2013.01); G06T 7/194 (2017.01); G06T 7/55 (2017.01); G06T 7/97 (2017.01)

(58) Field of Classification Search
CPC .. G06N 3/04; G06T 7/194; G06T 7/55; G06T 7/97
See application file for complete search history.

(56) References Cited

U.S. PATENT DOCUMENTS

| | | |
|---|---|---|
| 8,180,561 B2 | 5/2012 | Osanai |
| 9,443,316 B1 | 9/2016 | Takeda et al. |
| 9,632,505 B2 | 4/2017 | Hickerson et al. |
| (Continued) | | |

OTHER PUBLICATIONS

Peter Christiansen "Deep Anomaly: Combining Background Subtraction and Deep Learning for Detecting Obstacles and Anomalies in an Agricultural Field," Sensors 2016, pp. 1-21, vol. 16.
(Continued)

*Primary Examiner* — Adam R Mott
*Assistant Examiner* — Ricardo I Viscarra
(74) *Attorney, Agent, or Firm* — Christopher G. Darrow; DARROW MUSTAFA PC

(57) ABSTRACT

Systems, methods, and other embodiments described herein relate to detecting obstacles from unknown objects during automated driving by a vehicle. In one embodiment, a method includes generating, from an image that includes an unknown object, a depth map from a depth estimation component and processed data from a semantic segmentation component in parallel by using a neural network model. The method also includes detecting that the unknown object is an obstacle when the unknown object satisfies criteria using an optical model according to the depth map and a segmentation map. The method also includes determining a height of the obstacle and a distance to the obstacle according to the optical model and the criteria. The method also includes adapting a vehicle plan of the automated driving according to the height.

20 Claims, 7 Drawing Sheets

(56) References Cited

U.S. PATENT DOCUMENTS

| | | | |
|---|---|---|---|
| 10,217,223 | B2 | 2/2019 | Wang et al. |
| 10,529,083 | B2 | 1/2020 | Uliyar et al. |
| 2012/0195471 | A1 | 8/2012 | Newcombe et al. |
| 2013/0028053 | A1 | 1/2013 | Tsuji et al. |
| 2019/0096125 | A1* | 3/2019 | Schulter ............... G05D 1/0088 |
| 2019/0102902 | A1* | 4/2019 | Mianzo ..................... G06T 7/80 |
| 2019/0378287 | A1* | 12/2019 | Hollander .............. G06V 10/22 |
| 2020/0074674 | A1 | 3/2020 | Guo et al. |
| 2020/0098135 | A1 | 3/2020 | Ganjineh et al. |
| 2021/0089841 | A1* | 3/2021 | Mithun ..................... G06T 7/90 |
| 2021/0149408 | A1* | 5/2021 | Dodson .................... G06N 3/08 |
| 2021/0348930 | A1* | 11/2021 | Johnson, Jr. ..... G08G 1/096844 |
| 2021/0392314 | A1* | 12/2021 | Nims ................... G06F 1/1686 |

OTHER PUBLICATIONS

Hirata et al., "Real-Time Dense Depth Estimation using Semantically-Guided LIDAR Data Propagation and Motion Stereo," IEEE Robotics and Automation Letters, vol. 4, Jun. 2019, pp. 3806-3811.

Sunando Sengupta, "Semantic Mapping of Road Scenes," 2014, found at https://ethos.bl.uk/OrderDetails.do?uin=uk.bl.ethos. 668716.

Grinvald et al., "Volumetric Instance-Aware Semantic Mapping and 3D Object Discovery," IEEE Robotics and Automation Letters, vol. 4, pp. 3037-3044, Jul. 2019.

Weng et al., "Monocular 3D Object Detection with Pseudo-LiDAR Point Cloud," IEEE/CVF International Conference on Computer Vision (ICCV,) Mar. 2019, pp. 1-14.

Peter Christiansen, "TractorEYE: Vision-based Real-time Detection for Autonomous Vehicles in Agriculture," 2017, pp. 1-236, found at https://ebooks.au.dk/aul/catalog/download/277/192/831-2?inline= 1.

Xie et al., "Road obstacle detection and tracking by an active and intelligent sensing strategy," Machine Vision and Applications, vol. 7, Sep. 1994, pp. 165-177.

U.S. Appl. No. 16/570,048 to Rui Guo, Wenjie Luo, Shalini Keshavamurthy, Haritha Muralidharan, Fangying Zhai and Kentaro Oguchi, "System and Method for Estimating Depth Using a Monocular Camera," filed on Sep. 13, 2019.

* cited by examiner

SYSTEMS AND METHODS FOR OBSTACLE DETECTION USING A NEURAL NETWORK MODEL, DEPTH MAPS, AND SEGMENTATION MAPS

TECHNICAL FIELD

The subject matter described herein relates, in general, to a detection system, and, more particularly, to a vehicle using a neural network model and an optical model to detect obstacles from unknown objects.

BACKGROUND

Vehicles may perceive other vehicles, obstacles, pedestrians, and additional aspects of a surrounding environment by using sensors. For example, a vehicle may be equipped with a radar sensor that scans the surrounding environment. Logic associated with the radar may analyze acquired data to detect the presence of objects and other features of the surrounding environment. In further examples, additional/alternative sensors such as cameras may be implemented to acquire information about the surrounding environment from which a system derives awareness. This sensor data can be useful in various circumstances for improving perceptions of the surrounding environment so that systems, such as automated driving systems, can perceive the noted aspects and accurately plan and navigate accordingly.

In general, the further that a vehicle develops awareness about a surrounding environment, the better a driver can be supplemented with information to assist in driving and/or the better an automated system can control the vehicle to avoid hazards. In one approach, current systems use vehicle sensors to scan an environment for obstacles to safely and effectively maneuver during automated driving. However, current systems have perception challenges for scanning a driving environment. In particular, on-road obstacle detection, avoidance, and measurements remain challenging due to the variety of obstacle types, unknown objects, and limitations of vehicle sensor systems.

Concerning obstacle detection and measurements, a vehicle with an advanced sensor system may overload on-board computing systems for complex object measurements. The vehicle may particularly overload on-board computing systems during higher velocities in complex terrain that requires fast obstacle detection of various unknown objects. Moreover, advanced sensor systems may ineffectively detect the depth and the size of unknown or anomalous objects in environments such as off-road or unmapped locations. In certain environments, vehicles may also need special equipment, advanced light detection and ranging (LIDAR), three-dimensional radar, or the like for precise measurements of unknown and complex objects. Thus, current vehicle computing and sensor systems may ineffectively detect unknown and complex objects as obstacles, especially during automated driving.

SUMMARY

In one embodiment, example systems and methods relate to a vehicle using a monocular camera, a neural network model, and an optical model to detect obstacles associated with unknown objects in a surrounding environment. A vehicle computing and sensor system may be ineffective at detecting and measuring unknown objects according to an object type, an object category, or a driving environment. In particular, in various implementations, current on-board vehicle computing systems may be ineffective at obstacle detection by measuring complex unknown objects on complex roads, anomalous driving environments, or urban environments. Therefore, in one embodiment, a detection system may detect an obstacle by measuring a height and a distance to an object using monocular depth estimation. An automated driving system may adapt a motion plan or maneuver according to the detected obstacle. Furthermore, the detection system may find that unknown objects are obstacles using an optical model that estimates size using a depth map and a segmentation map generated in parallel using a network architecture that includes a neural network model. In one approach, the detection system may use red, green, and blue (RGB) values from a monocular camera sensor to detect and measure on-road unknown objects in an unmapped environment using the generated depth map and the segmentation map. In addition, the detection system may measure the complex object by fusing data from a ranging sensor with the monocular object detection system.

In one embodiment, a detection system for detecting obstacles from unknown objects during automated driving by a vehicle is disclosed. The detection system includes one or more processors and a memory communicably coupled to the one or more processors. The memory stores a detection module including instructions that when executed by the one or more processors cause the one or more processors to generate, from an image that includes an unknown object, a depth map from a depth estimation component and processed data from a semantic segmentation component in parallel by using a neural network model. The detection module also includes instructions to detect that the unknown object is an obstacle when the unknown object satisfies criteria using an optical model according to the depth map and a segmentation map. The memory also stores a determination module including instructions that when executed by the one or more processors cause the one or more processors to determine a height of the obstacle and a distance to the obstacle according to the optical model and the criteria. The determination module also includes instructions to adapt a vehicle plan of the automated driving according to the height.

In one embodiment, a non-transitory computer-readable medium for detecting obstacles from unknown objects during automated driving by a vehicle and including instructions that when executed by one or more processors cause the one or more processors to perform one or more functions is disclosed. The instructions include instructions to generate, from an image that includes an unknown object, a depth map from a depth estimation component and processed data from a semantic segmentation component in parallel by using a neural network model. The instructions also include instructions to detect the unknown object is an obstacle when the unknown object satisfies criteria using an optical model according to the depth map and a segmentation map. The instructions also include instructions to determine a height of the obstacle and a distance to the obstacle according to the optical model and the criteria. The instructions also include instructions to adapt a vehicle plan of the automated driving according to the height.

In one embodiment, a method for detecting obstacles from unknown objects during automated driving by a vehicle is disclosed. In one embodiment, the method includes generating, from an image that includes an unknown object, a depth map from a depth estimation component and processed data from a semantic segmentation component in parallel by using a neural network model. The method also includes detecting that the unknown object is an obstacle when the unknown object satisfies criteria using an optical model according to the depth map and a segmentation map. The method also includes determining a height of the obstacle and a distance to the obstacle according to the optical model and the criteria. The method also includes adapting a vehicle plan of the automated driving according to the height.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving obstacle detection using a detection system are disclosed herein. In one approach, an automated driving system may adapt a vehicle plan or maneuver according to the detected obstacle. The detection system may determine a height and a distance of an unknown object using the pixel intensity of an image from a monocular camera and an optical model. The detection system may use monocular depth estimation in scenarios including unreliable pixel intensity estimates to increase distance accuracy with less complexity. In particular, the detection system may implement a neural network model with minimal training that processes red, green, and blue (RGB) values from a monocular camera sensor to generate a depth map and a segmentation map in parallel using a network and data processing flow. Accordingly, the detection system reduces complexity and increases performance speed by estimating the unknown object height and distance using the optical model and a single neural network model with minimal training. Furthermore, using a single neural network model to generate a segmentation map and a depth map in parallel may increase efficiency and feature resolution of a processed image thereby improving obstacle detection.

Moreover, the detection system may determine that an unknown object is an obstacle by satisfying criteria. The detection system may compare an estimated height or vertical range and depth of the unknown object to the criteria associated with various known and unknown road obstacles. In addition, the detection system 170 may identify a category, such as a semantic class, of the unknown object by localization, crowdsourcing, or the like. The detection system may subsequently determine the height and the distance to the obstacle using the optical model if the detected unknown object satisfies the criteria.

In addition, the detection system may detect obstacles by fusing the aforementioned monocular size estimation with ranging data. In particular, the detection system may use ranging to detect unknown flat objects or complex and unknown objects. The detection system may use the aforementioned monocular size estimation when discovering a potential object with vertical existence using the ranging. In one approach, the detection system may label detected objects as proto-obstacles before monocular size estimation. In this way, the detection system may improve detection capabilities and robustness of obstacles by fusing ranging data with monocular size estimation.

Figure 1:
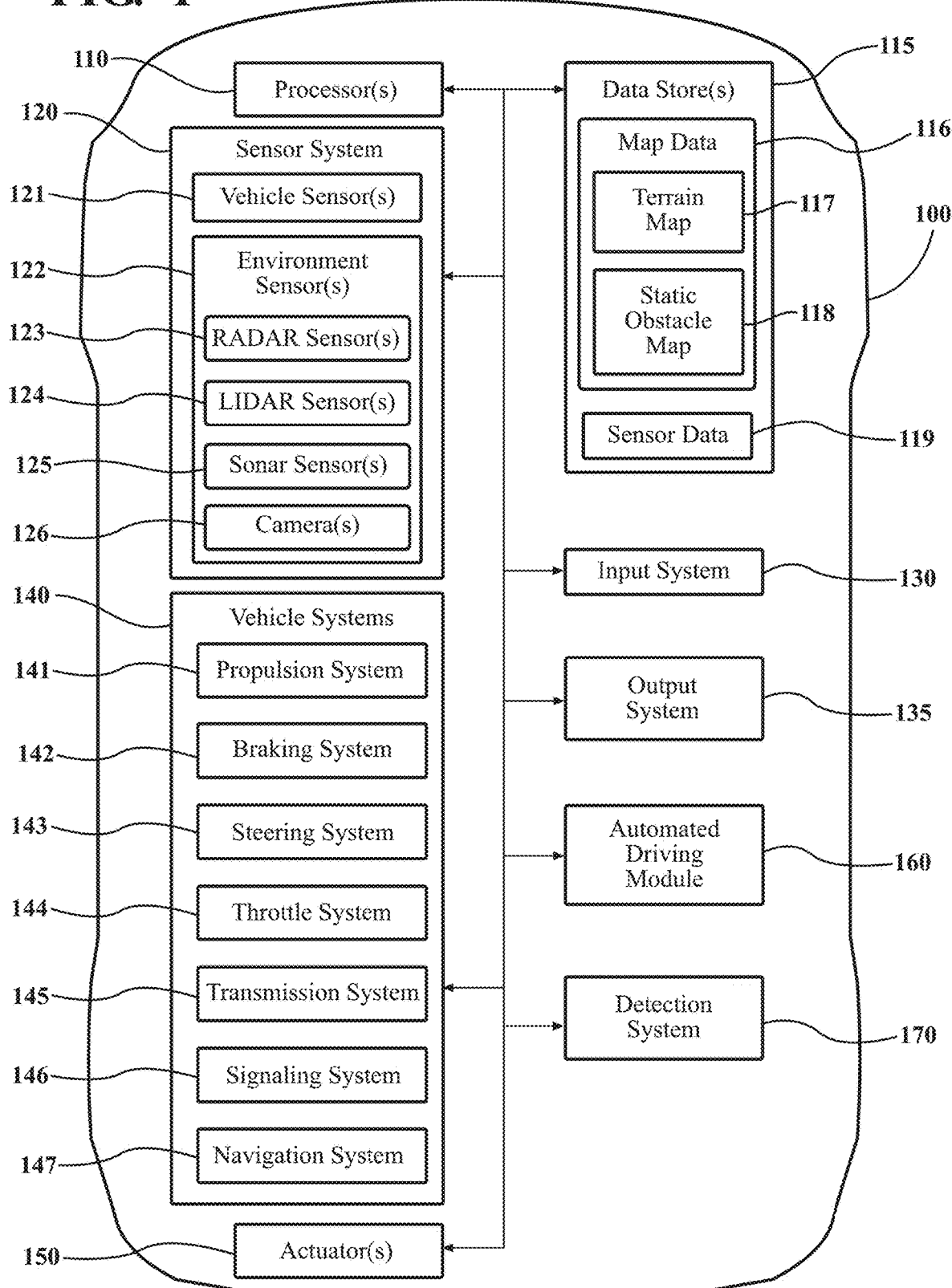
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with a detection system that may detect unknown objects as obstacles using a network architecture that concurrently or in parallel generates image maps, an optical system, and/or sensor fusion.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a detection system 170 that is implemented to perform methods and other functions as disclosed herein relating to improving detection of obstacles using an optical model and a neural network model to detect unknown objects in unknown areas. As will be discussed subsequently in greater detail, the detection system 170, in various embodiments, is implemented partially within the vehicle 100. For example, in one approach, functionality associated with at least one module of the detection system 170 is implemented within the vehicle 100 while further functionality is implemented within a server, an edge server, a cloud-based computing system, or the like.

Figure 2:
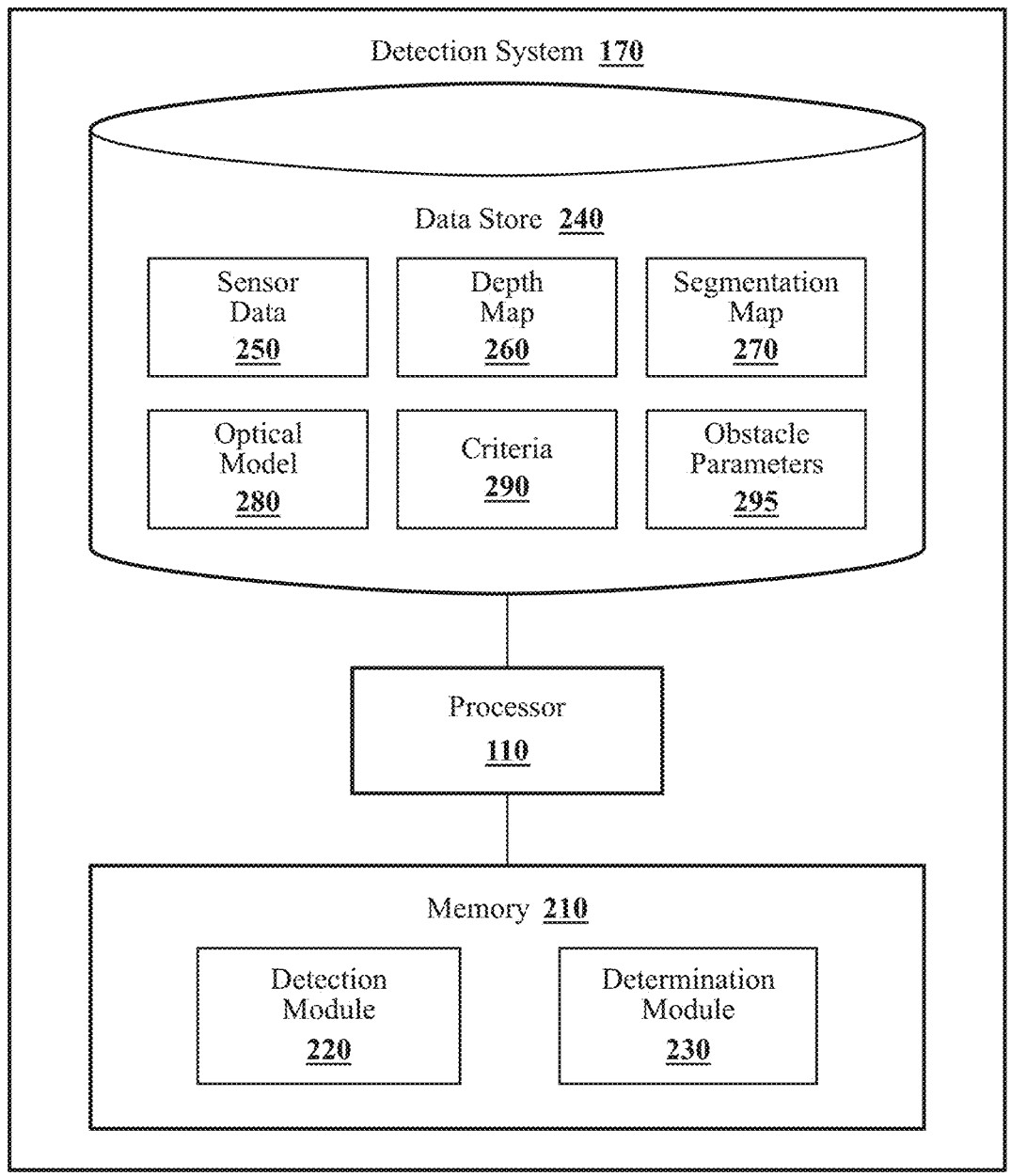
FIG. 2 illustrates one embodiment of a detection system that is associated with using a depth map and a segmentation map to detect unknown objects in a surrounding environment.

With reference to FIG. 2, one embodiment of the detection system 170 is illustrated using a depth map and a segmentation map to detect unknown objects in a surrounding environment. In one approach, the detection system 170 may indicate a detected obstacle to an automated driving system (ADS) to adapt a vehicle plan, a motion plan, or a maneuver during automated driving.

The detection system 170 is shown as including a processor 110 from the vehicle 100 of FIG. 1. Accordingly, the processor 110 may be a part of the detection system 170, the detection system 170 may include a separate processor from the processor 110 of the vehicle 100, or the detection system 170 may access the processor 110 through a data bus or another communication path. In one embodiment, the detection system 170 may include a memory 210 that stores a detection module 220 and a determination module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

The detection system 170 as illustrated in FIG. 2 is generally an abstracted form of the detection system 170. In one approach, an electronic control unit (ECU) of the vehicle 100 may execute the detection system 170. Moreover, the detection module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires sensor data 250 that includes at least camera images. In further arrangements, the detection module 220 acquires the sensor data 250 from further sensors such as a radar 123, a light detection and ranging (LIDAR) 124, and other sensors as may be suitable for identifying vehicles and locations of the vehicles.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the detection system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the data store 240 further includes the depth map 260, the segmentation map 270, the optical model 280, the criteria 290, and the obstacle parameters 295. The detection module 220, in one embodiment, is further configured to perform additional tasks beyond controlling the respective sensors to acquire and provide the sensor data 250. In particular, the detection module 220 and the detection system 170 may generate the depth map 260 and the segmentation map 270. The depth map 260 may be information that identifies the distance to known or unknown objects proximate to the vehicle 100. In one approach, the depth map 260 may use a pixel intensity to represent the distance between the camera 126 and objects proximate to the vehicle 100. Furthermore, the segmentation map 270 may be information that includes scene semantics associated with object categories or object sizes in an image.

Moreover, the detection system 170 and the detection module 220 may also utilize an advanced generative adversarial network (GAN) for image processing and object size determination. However, in the examples given herein, the detection system 170 may use another neural network model to generate both the depth map 260 or the segmentation map 270. For example, the detection system 170 may use a convolutional neural network (CNN), to perform semantic segmentation over the sensor data 250 for object detection. In one approach, the detection system 170 may use a network architecture to convert a red, green, and blue (RGB) monocular image input into the depth map 260 and the segmentation map 270 in parallel. As an example, a RGB monocular image may be generated by a monocular camera that uses a single lens to produce an image for depth estimation. In one approach, the detection module 220 may perceive the unknown object height using an absolute vertical pixel gain. For example, the detection system 170 may derive the absolute vertical pixel gain of the object in an image plane associated with the image. In one approach, the detection module 220 may determine the absolute vertical pixel gain using the segmentation map 270.

The determination module 230 may include instructions that cause the processor 110 to determine or estimate the obstacle parameters 295. As further explained herein, the determination module 230 may use the optical model 280 and the depth map 260 to estimate the size, the height, or the distance of an object. In particular, the determination module 230 may use optical geometries to determine the real-world height of the object.

Figure 3:
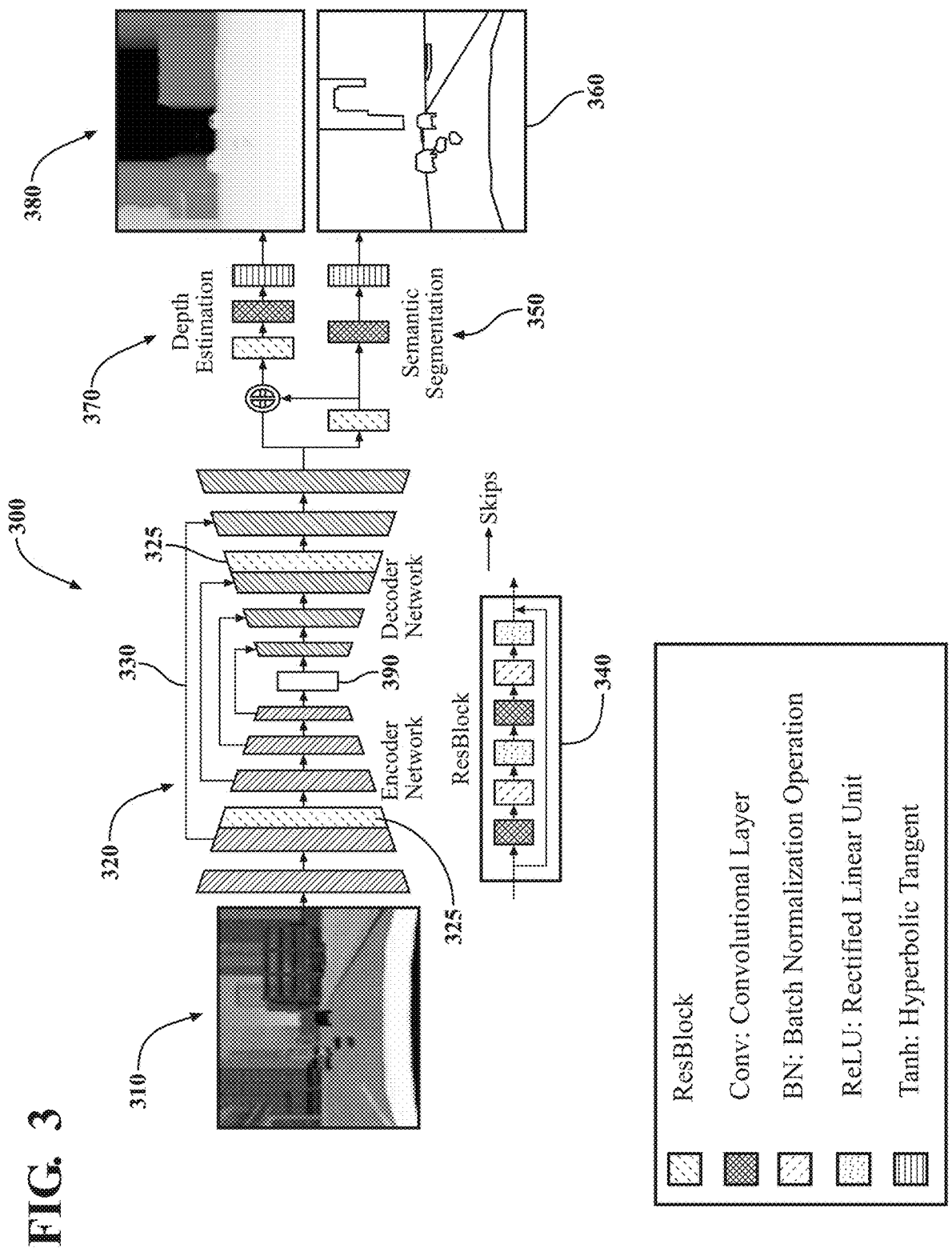
FIG. 3 illustrates one embodiment of a network architecture that includes a neural network model that processes an image to detect unknown objects.

Turning to FIG. 3, the figure illustrates one embodiment of a network architecture 300 that includes a neural network model. In one approach, the neural network model processes an image to detect unknown objects according to a pixel intensity and categories. For example, an object category may be associated with one or more semantic classes or scene semantics. In one approach, the network architecture 300 may also use the input image 310 from the camera 126 to detect and measure unknown objects without directly relying on data from radar sensors 123, LIDAR sensors 124, or the like. In one embodiment, the image 310 may be an RGB image from a monocular camera. The vehicle 100 may safely pass an unknown object during automated driving by the automated driving modules(s) 160 factoring the determined size, height, or the like. Furthermore, in one approach, the network architecture 300 may detect an unknown object as an obstacle using the same or substantially the same neural network model to calculate the depth map 380 and the segmentation map 360 in parallel from an RGB image.

The network architecture 300 may determine the obstacle parameters 295 more accurately by combining reconstruction, adversarial, and segmentation losses of RGB data to train the neural network model 320. Once the neural network model 320 reaches a steady-state, the obstacle parameters 295 may be estimated. In one approach, the network architecture 300 may also perform more independent obstacle detection without ground-truths, specific training, object category knowledge, object registration, object calibration, obstacle location, map data, or the like. For example, the network architecture 300 may use the neural network model 320 configured as an auto-encoder network operating with minimal training. In this way, the network architecture 300 improves detecting unknown objects or obstacles in unmapped areas using less complex computing systems in the vehicle 100.

The neural network model 320 illustrates using five encoders and decoders. However, the neural network model 320 may include any number of encoders and decoders to process the input image 310. The encoder in the neural network model 320 may project input data into a lower-dimensional space, where the data may be associated with a special pattern, a distribution, or a probability distribution function (PDF). The neural network model 320 may perform operations to reduce image distortion, blurriness, and errors in the lower-dimensional latent space 390 with reduced processing complexity. The neural network model 320 may then convert the data back to the original space with denser image data to complete the reconstruction after the operations in the lower-dimensional space. In one approach, the neural network model 320 may also remove artifacts, noise, or the like from the input image 310 during processing. In this way, the network architecture 300 may generate an enhanced version of the original input image 310 to facilitate improved depth and segmentation maps for obstacle detection.

Moreover, an encoder in the neural network model 320 may include multiple layers that adapt input data, vectorized numerical values, or the like. The neural network model 320 may transform the input into a new data or new vectorized data via linear or non-linear operations. In one approach, the encoder output or result may be a new vector with a smaller dimension than the input data. The new vector or smaller dimension may be an image feature in the latent space 390 of the neural network model 320. Furthermore, the decoder may take the feature as an input to perform an inverse operation to map the image feature back to the original input space. In one approach, the output of the decoder may be a vector with the same dimension as the input to the encoder with desirably more density and less noise.

In addition, the neural network model 320 processing may add residual block (resblock) 340 layer(s) operation(s) to an encoder or a decoder. In association with the encoder or the decoder, the resblock 340 may be an extra layer(s) that enriches representation learning of the neural network model 320 by processing a sequential data flow of the encoder. In one approach, the resblock 340 may include convolutional layer(s) operation(s), batch normalization operators, or rectified linear units to process residual data outputted by an encoder. In addition, the neural network model 320 may use the rectified linear unit as an activation function for further neural network processing. Concerning resblock 340 layer(s) operation(s), the neural network model 320 may use resblocks 325 between the encoder network and the decoder network to improve feature representation, feature learning, or feature clarity of the processed input image 310 by avoiding loss from the dimensional reduction between encoder layers. Furthermore, the neural network model 320 may use a skip 330 connection to provide a cross-layer connection by feeding a previous layer's information to concatenate with another layer. In this way, the skip 330 connection may provide higher-dimensional data and skip multiple layers that may be auxiliary for a particular data output in the neural network model 320.

Moreover, the network architecture 300 may generate maps in parallel, concurrently, or substantially concurrently by the semantic segmentation component 350 and the depth estimation component 370 using processed monocular image data from the neural network model 320. The network architecture 300 may use separate, parallel pipelines or data flows for the semantic segmentation component 350 and the depth estimation component 370. In one approach, the depth estimation component 370 may use information from the semantic segmentation component 350 to seed derivations of the depth map 380 at different time instances. Concerning the semantic segmentation component 350, the segmentation map 360 may be generated by the resblock 340 layer(s) operation(s), convolution layer(s) operation(s), and a hyperbolic tangent operation performed on the data output of the neural network model 320.

The depth estimation component 370 may generate the depth map 380 using the image data output of the neural network model 320 and the data output fed from the semantic segmentation component 350 after resblock layer(s) processing. In particular, the depth estimation component 370 may generate the depth map 380 by using the resblock 340 layer(s) operation(s), convolution layer(s) operation(s), and a hyperbolic tangent (tan h) operation on the processed image data from the neural network model 320. In one approach, the depth estimation component 370 may output, as the same size as the input image 310, the depth map 380 image in grayscale. For example, an intensity of each pixel of the depth map 380 in grayscale may represent the distance between the camera 126 and objects proximate to the vehicle 100. In addition, the network architecture 300 may calculate the segmentation map 360 in parallel, substantially concurrently, or at substantially the same time as the depth map 380 in grayscale using the neural network model 320 output. In this way, the network architecture 300 may estimate size or distance to unknown objects in unmapped areas using monocular image data for obstacle detection with less complexity. Also, using a single neural network model to generate a segmentation map and a depth map in parallel may increase efficiency, speed, and feature resolution of a processed image thereby improving obstacle detection.

In one embodiment, the network architecture 300 may use both the segmentation map 360 and the depth map 380 in grayscale and images from other views to determine an object type, a distance, or a per-pixel category. For example, the red pixels in the segmentation map 360 may represent objects in the vehicle category. The gray pixels in the segmentation map 360 may represent pixels from an unknown category. Furthermore, the network architecture 300 may perform a search to estimate a bounding box around the detected object by segmenting out certain unknown categories of objects on the road associated with the input image 310. In one approach, grayed objects in the segmentation map 360 may be rocks, anomalous objects, or the like that are segmented out and labeled as an unknown category of objects. The network architecture 300 may use various other pixel colors to identify roads, plants, pedestrians, or the like. In addition, the network architecture 300 may determine the bounding box and the obstacle parameters 295 using pixel measurements and intensities.

Figure 4:
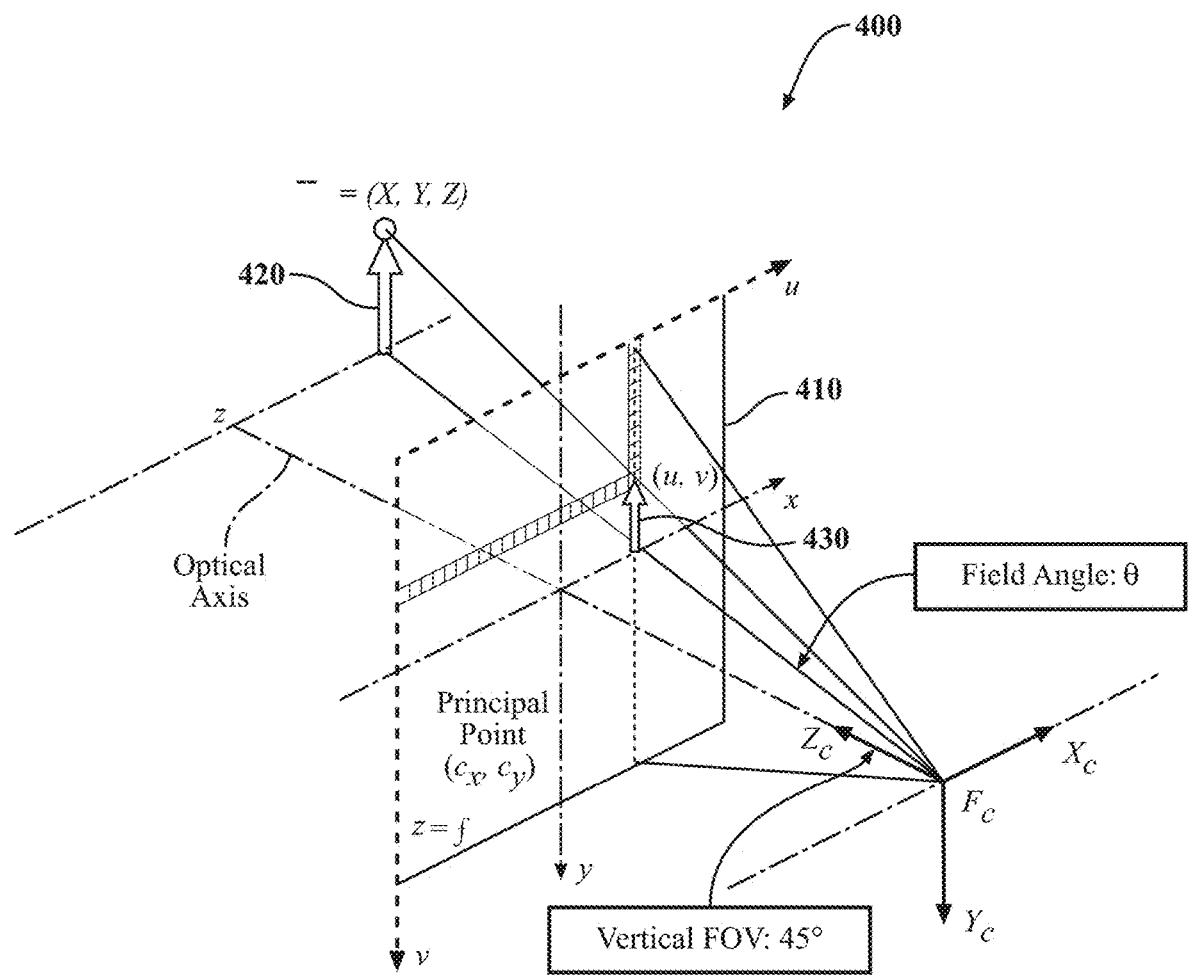
FIG. 4 illustrates one embodiment of an optical system used to estimate the height of an unknown object from a processed image.

Turning to FIG. 4, the detection system 170 may estimate unknown object parameters using an optical system. FIG. 4 illustrates one embodiment of an optical system 400 that uses the optical model 280 to estimate the height of an unknown object from a processed image. In the optical system 400, a perceived height of the object in the image plane 410 may be calculated using the absolute vertical pixel gain from the bottom to the top of the object associated in part with the segmentation map 270. The detection system 170 may use the optical system 400 to estimate a vertical range from approximately 0 to height Z. For example, an approximate 0 height may be a lane marking on a road or other flat object that the vehicle 100 can ignore, especially during automated driving.

Moreover, the detection system 170 may use the optical model 280 and the depth map 260 to estimate the size of an object from an image. In the optical system 400, the vector 420 may be a real measurement of the object on the road. The vector 430 may be the measurement of the same object captured in the image at the image plane 410. The detection system 170 may calculate the height Z according to Equation (1):

$$\text{Height } (Z) = (v - c_y)/F_y * D_1 \quad \text{Equation (1)}$$

where v is the pixel's vertical coordinate of the vector 430, and $c_y$ is the vertical coordinate of principal point or centroid of the image. Furthermore, $F_y$ is the vertical focal length and the determination module 230 may estimate the distance $D_1$ from the depth map 260 associated with point (u, v) of the vector 430. The optical system 400 may use an approximately 45-degree vertical field-of-view (FOV) to estimate the vector 430. The optical system 400 may also use a field angle θ to estimate the vector 420 or the vector 430. In this way, the detection system improves the detection of unknown objects in unmapped areas by the optical system 400 using an accurate depth map 260 and a segmentation map 270 generated in parallel by a neural network model.

Figure 5:
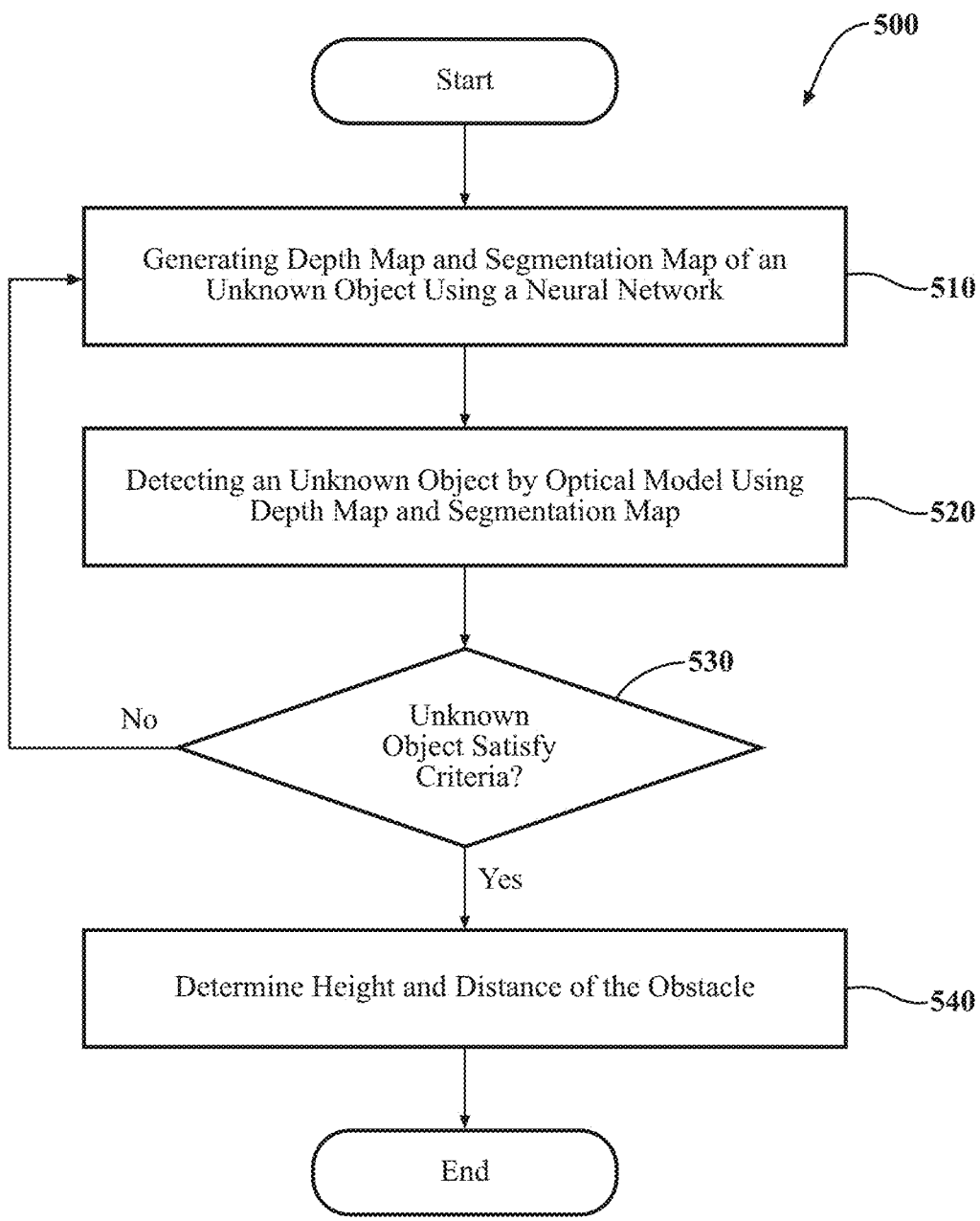
FIG. 5 illustrates one embodiment of a method that is associated with obstacle detection by an optical system using neural network processing, a depth map, and a segmentation map.

Additional aspects of a vehicle using a neural network model, an optical model, and sensor fusion to detect obstacles in a surrounding environment will be discussed in relation to FIG. 5. FIG. 5 illustrates a flowchart of a method 500 that is associated with obstacle detection by an optical system using neural network processing, a depth map, or a segmentation map. In one approach, an ADS may adapt a vehicle plan, motion plan, or maneuver according to the detected obstacle during automated driving. Method 500 will be discussed from the perspective of the detection system 170 of FIGS. 1 and 2. While method 500 is discussed in combination with the detection system 170, it should be appreciated that the method 500 is not limited to being implemented within the detection system 170 but is instead one example of a system that may implement the method 500.

In method 500, the vehicle 100 may use a detection system 170 that estimates the obstacle parameters 295, such as the height or the distance, of unknown objects on a road. For efficiency and improved resolution, the detection system 170 may use a neural network model to generate a depth map and a segmentation map in parallel from an image, such as a monocular RGB image. The detection system 170 may determine the height and the distance to the obstacle if the unknown object satisfies the criteria 290.

At 510, the detection module 220 may generate a depth map and a segmentation map of an unknown object from image data in parallel using the neural network model with minimal specific training. In one approach, the image may be a monocular RGB image. The detection system 170 may calculate the segmentation map 360 in parallel, concurrently, or substantially concurrently with the depth map 380 in grayscale. In this way, the detection system 170 may estimate size or distance to unknown objects, particularly in unmapped areas, using image data for obstacle detection.

The detection system 170 may use a neural network model with an X number encoders and decoders for processing and deep learning of the image data. In one approach, the detection system 170 may determine the obstacle parameters 295 more accurately by combining reconstruction, adversarial, and segmentation losses of image data to train the neural network model 320. Once the detection system 170 training of the neural network reaches a steady-state, the obstacle parameters 295 may be estimated. In this way, the detection system 170 may generate more accurate color and gray coded maps by the semantic segmentation component 350 and the depth estimation component 370 using the processed neural network data of the image. For example, the pixel clarity or the feature resolution may increase by the depth map 380 using the image data output of the neural network model 320 and the data output from the semantic segmentation component 350 after resblock layer(s) processing.

Concerning the semantic segmentation component 350, the segmentation map 360 may be generated by the resblock 340 layer(s) operation(s), convolution layer(s) operation(s), and a hyperbolic tangent operation performed on the data output of the neural network model 320. In one approach, red pixels in the segmentation map 360 may represent objects in the vehicle category and gray pixels may represent pixels from an unknown category. Concerning the depth map 380, the depth estimation component 370 may generate a more accurate depth map 380 using the data output of the neural network model 320 and processed image data from the semantic segmentation component 350. Furthermore, for the depth map 380 in grayscale, an intensity of each pixel may represent the distance between the camera 126 and objects proximate to the vehicle 100.

At 520, the detection system 170 may detect the unknown object by an optical model 280 using the segmentation map 360 and the depth map 380. The detection system 170 may use an optical system 400 to determine a perceived height vector of the unknown object associated with an image plane. For example, the optical system 400 may use a pinhole camera model. The detection system 170 may also use the optical system 400 and the depth map 380 to estimate a vertical height value of the unknown object perceived in the physical world by using the similarity of the measurement in geometric optics with a camera model, such as optical model 280.

At 530, the detection module 220 may determine if the detected unknown object satisfies the criteria 290. The detection module 220 may perform a comparison operation of the perceived height or vertical range and depth of the unknown object to the criteria 290. For example, an unknown object may be an empty box or road debris if the perceived height is nine inches high at an estimated depth distance of ten meters. In one approach, the criteria 290 may include meeting tolerance levels, confidence level, confidence intervals, or statistical bands for height or depth associated with various obstacles. In another example, the detection module 220 may determine the satisfaction of the criteria 290 according to a boundary box generated using the estimated height that matches a set of possible obstacles. In addition, the detection system 170 may identify a category of the unknown object by localization, crowdsourcing, or the like. The detection system 170 may localize an unknown object according to the context from map data, sensor data 250, perception information, or the like.

At 540, if the detection module 220 determines that the detected unknown object satisfies the criteria 290 according to the comparison operation, the determination module 230 may determine the height and the distance of the obstacle. The determination module 230 may determine the height of the obstacle using the same parameters of the unknown object in Equation (1). In one approach, the determination module 230 may determine distance using the depth map 380, sensor fusion, a range finder, or the like. As an outcome, the vehicle 100 may subsequently maneuver, adapt a motion plan, adapt a vehicle plan, or the like during automated driving according to the height and distance to the obstacle. Furthermore, the detection system 170 may register the obstacle's location, the obstacle parameters 295, or the like with other vehicles or a server to improve the safety of intelligent transportation systems (ITS).

Figure 6:
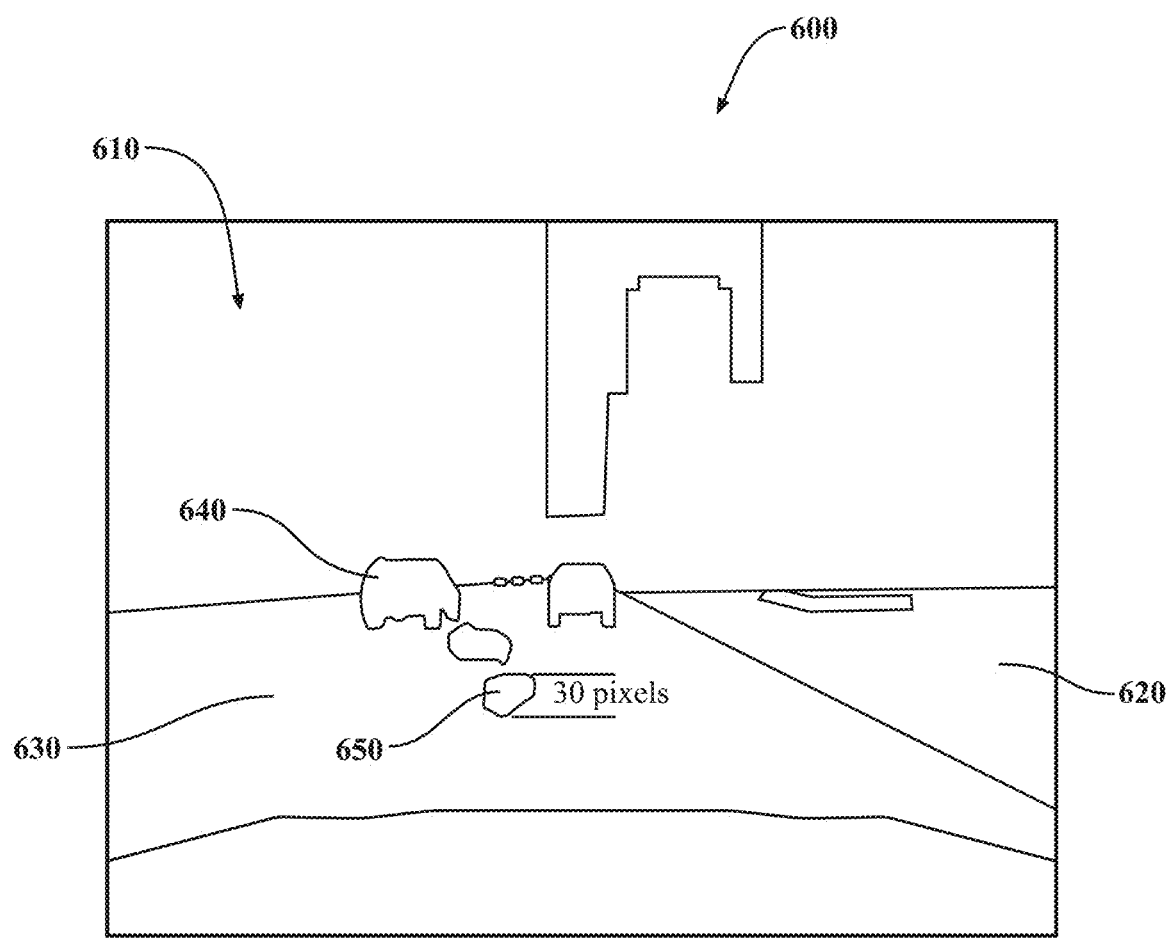
FIG. 6 illustrates an image plane of unknown objects generated by a detection system using a depth map in grayscale and a segmentation map associated with a red, green, and blue (RGB) image.

FIG. 6 illustrates an image plane 600 of unknown objects generated by a detection system using a depth map 260 in grayscale and a segmentation map 270 associated with a RGB image. The vehicle 100 may be operating in an automated driving mode in the vehicle driving environment 610. In one approach, the detection system 170 may disregard objects in the area 620 and search for unknown objects on the road area 630. The detection system 170 may color code objects in the image plane 600. For instance, the vehicle 640 may be red and the unknown object 650 gray.

In addition, the detection system 170 may detect obstacles by estimating the height and the distance to the unknown object 650. The vehicle 100 may safely maneuver, adapt a vehicle plan, or adapt a motion plan during automated driving using the characteristics or features of the obstacle. For example, the detection system 170 and the detection module 220 may precisely estimate the height of the unknown object 650 as 30 pixels. In one approach, the detection system 170 may measure the height in pixels according to an optical model represented in Equation (1) and convert the pixel value to inches or meters to use by the vehicle systems 140.

Furthermore, the vehicle 100 may display the image plane 600 in a heads-up display (HUD), center console, or the like for an operator. In one approach, when the unknown object 650 is detected as an obstacle, the operator may takeover or disengage the automated driving according to a perceived collision or danger. In another approach, the detection system 170 may recommend that the operator or the automated driving module 160 ignore the unknown object 650 according to the calculated height, size, distance, or range.

Figure 7:
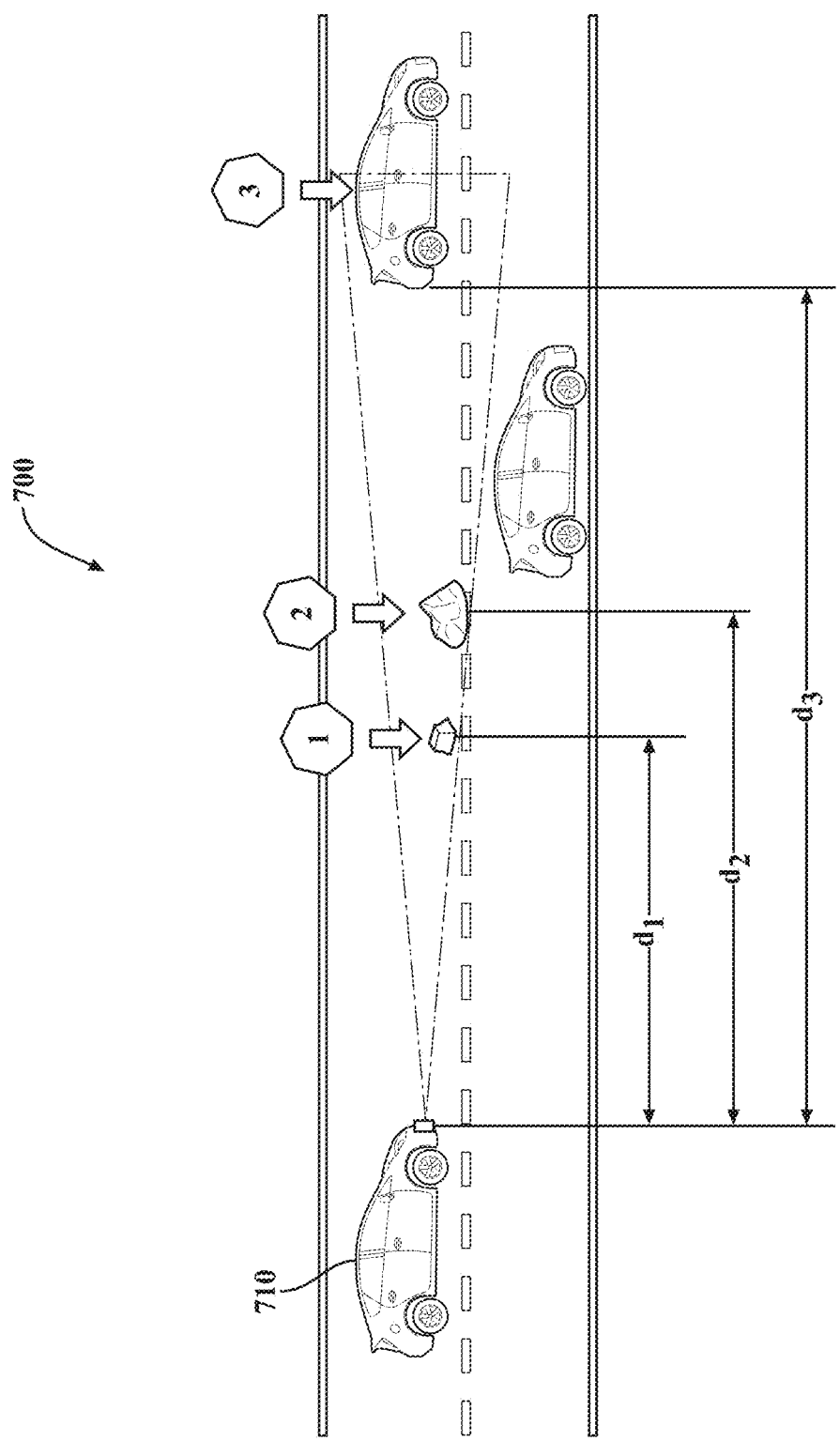
FIG. 7 illustrates a diagram using ranging with a depth map in grayscale for obstacle detection.

FIG. 7 illustrates a diagram using ranging with a depth map in grayscale for obstacle detection 700. The vehicle 710 may use the detection system 170 and ranging to detect obstacles given unknown flat objects, unknown complex objects, hilly roads, curvy roads, or the like. In one approach, the vehicle 100 may fuse data from the cameras 126, the radar sensors 123, the LIDAR sensors 124, the sonar sensors 125, or the like to estimate distance $D_1$ for the optical model represented by Equation (1). The detection system 170 may trigger obstacle detection when a potential object with vertical existence is found from the ranging. The detection system 170 may estimate distances $d_1$, $d_2$, or $d_3$ and related angle information to objects 1-3, respectively. In one approach, the detection system 170 may determine vertical existence Z on the road of objects 1-3 within the field-of-view by generating depth and segmentation maps in parallel using a neural network model and an optical model.

In addition, the detection system 170 may be unaware of the category and complete size information of objects 1-3. Accordingly, the detection system 170 may label the detected objects 1-3 as a proto-obstacle. The vehicle 710 may continue radar scanning until detecting a reflection from an object with vertical existence. The detection system 170 may initiate obstacle detection according to the detected reflection. The detection system 170 may also determine the distance and angle relative to a mounted position of the camera(s) 126 to the proto-obstacles according to the detected reflections.

In addition, the detection system 170 may compare the distance and the angle of the proto-obstacle in the depth map 260 to a proto-obstacle list. This comparison by the detection may determine if an unknown object is an obstacle. In one approach, the detection system 170 may communicate with a registration system. The registration system may remove the unknown object from the obstacle list if the detection system 170 identifies an unknown object on the segmentation map 270 is missing from the proto-obstacle list. In this way, the registration list may more accurately maintain a list of obstacles for vehicles in an ITS to avoid collisions.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous or automated vehicle. As used herein, "autonomous vehicle" refers to a vehicle that is capable of operating in an autonomous or automated mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an ECU, an application-specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located on-board the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a GPS, a local positioning system, or a geolocation system.

The processor(s) 110, the detection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the society of automotive engineers (SAE) 0 to 5 levels.

The processor(s) 110, the detection system 170, and/or the automated driving module(s) 160 can be operatively connected to communicate with the various vehicle systems 140 and/or individual components thereof. For example, returning to FIG. 1, the processor(s) 110, the detection system 170, and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140.

The processor(s) 110, the detection system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110, the detection system 170, and/or the automated driving module(s) 160 can cause the vehicle 100 to accelerate, decelerate ( ) and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be element or combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. A computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system for automated driving by a vehicle, comprising:
    one or more processors;
    a memory communicably coupled to the one or more processors and storing:
    a detection module including instructions that when executed by the one or more processors cause the one or more processors to:
        generate, from an image that includes an unknown object, a depth map from a depth estimation component and processed data from a semantic segmentation component in parallel by using a neural network model;
        detect that the unknown object is an obstacle when the unknown object satisfies criteria using an optical model according to the depth map and a segmentation map; and
    a determination module including instructions that when executed by the one or more processors cause the one or more processors to:
        perceive a height of the obstacle using a predicted distance towards the obstacle according to the optical model and the criteria and using an estimate from the optical model including a pixel gain vertically between ends of the obstacle associated with the segmentation map; and
        adapt a vehicle plan of the automated driving according to the height.

2. The detection system of claim 1, wherein the detection module further comprises instructions to identify the unknown object by using the neural network model to satisfy the criteria according to monocular red, green, and blue (RGB) values of the image.

3. The detection system of claim 2, wherein the detection module further comprises instructions to generate a grayscale depth map associated with the depth map by using the neural network model on the monocular RGB values, wherein a pixel intensity of the grayscale depth map represents an estimated distance to the unknown object.

4. The detection system of claim 3, wherein the determination module further comprises instructions to determine the predicted distance and a per-pixel category with color-coding of the unknown object by using the grayscale depth map and the segmentation map.

5. The detection system of claim 1, wherein the determination module includes instructions to perceive the height of the obstacle further including instructions to perceive the height of the obstacle by using an absolute gain of the pixel gain of the unknown object in an image plane according to the optical model and the height is a real-world height.

6. The detection system of claim 1, wherein the determination module includes instructions to perceive the height of the obstacle further including instructions to measure the height by using the optical model and the predicted distance according to the depth map.

7. The detection system of claim 1, wherein the determination module further comprises instructions to adapt a tolerance level of the criteria according to on-road known objects and unknown items in a map database for other vehicles to avoid collisions, wherein the criteria is associated with a relationship between a height and a depth derived from the depth map about the unknown object.

8. The detection system of claim 1, wherein the determination module further comprises instructions to update a map database on a remote server with parameters of the obstacle when the unknown object is missing, unregistered, or anomalous in the map database for other vehicles to avoid collisions with the unknown object.

9. A non-transitory computer-readable medium for detections during automated driving by a vehicle and including instructions that when executed by one or more processors cause the one or more processors to:
    generate, from an image that includes an unknown object, a depth map from a depth estimation component and processed data from a semantic segmentation component in parallel by using a neural network model;
    detect that the unknown object is an obstacle when the unknown object satisfies criteria using an optical model according to the depth map and a segmentation map;
    perceive a height of the obstacle using a predicted distance towards the obstacle according to the optical model and the criteria and using an estimate from the optical model including a pixel gain vertically between ends of the obstacle associated with the segmentation map; and
    adapt a vehicle plan of the automated driving according to the height.

10. The non-transitory computer-readable medium of claim 9 further comprising instructions that when executed by one or more processors cause the one or more processors to identify the unknown object by using the neural network model to satisfy the criteria according to monocular red, green, and blue (RGB) values of the image.

11. The non-transitory computer-readable medium of claim 10 further comprising instructions that when executed by one or more processors cause the one or more processors to generate a grayscale depth map associated with the depth map by using the neural network model on the monocular RGB values, wherein a pixel intensity of the grayscale depth map represents an estimated distance to the unknown object.

12. The non-transitory computer-readable medium of claim 11 further comprising instructions that when executed by one or more processors cause the one or more processors to determine the predicted distance and a per-pixel category with color-coding of the unknown object by using the grayscale depth map and the segmentation map.

13. A method for detecting obstacles from unknown objects during automated driving by a vehicle, the method comprising:
- generating, from an image that includes an unknown object, a depth map from a depth estimation component and processed data from a semantic segmentation component in parallel by using a neural network model;
- detecting that the unknown object is an obstacle when the unknown object satisfies criteria using an optical model according to the depth map and a segmentation map;
- perceiving a height of the obstacle using a predicted distance towards the obstacle according to the optical model and the criteria and estimating with the optical model for the height a pixel gain vertically between ends of the obstacle associated with the segmentation map; and
- adapting a vehicle plan of the automated driving according to the height.

14. The method of claim 13, further comprising:
- identifying the unknown object by using the neural network model to satisfy the criteria according to monocular red, green, and blue (RGB) values of the image.

15. The method of claim 14, further comprising:
- generating a grayscale depth map associated with the depth map by using the neural network model on the monocular RGB values, wherein a pixel intensity of the grayscale depth map represents an estimated distance to the unknown object.

16. The method of claim 15, further comprising:
- determining the predicted distance and a per-pixel category with color-coding of the unknown object by using the grayscale depth map and the segmentation map.

17. The method of claim 13, wherein perceiving the height of the obstacle further comprises perceiving the height of the obstacle by using an absolute gain of the pixel gain of the unknown object in an image plane according to the optical model and the height is a real-world height.

18. The method of claim 13, wherein perceiving the height of the obstacle further comprises measuring the height by using the optical model and the predicted distance according to the depth map.

19. The method of claim 13, further comprising:
- adapting a tolerance level of the criteria according to on-road known objects and unknown items in a map database for other vehicles to avoid collisions, wherein the criteria is associated with a relationship between a height and a depth derived from the depth map about the unknown object.

20. The method of claim 13, further comprising:
- updating a map database on a remote server with parameters of the obstacle when the unknown object is missing, unregistered, or anomalous in the map database for other vehicles to avoid collisions with the unknown object.

* * * * *

UNITED STATES PATENT AND TRADEMARK OFFICE
CERTIFICATE OF CORRECTION

PATENT NO. : 12,204,340 B2
APPLICATION NO. : 16/996495
DATED : January 21, 2025
INVENTOR(S) : Rui Guo and Kentaro Oguchi Page 1 of 1

It is certified that error appears in the above-identified patent and that said Letters Patent is hereby corrected as shown below:

In the Claims

In Claim 13, Column 21, Lines 1 and 2, please remove "obstacles from unknown objects"

Signed and Sealed this
Eighteenth Day of February, 2025

Coke Morgan Stewart
*Acting Director of the United States Patent and Trademark Office*